United States Patent
Oroskar et al.

(10) Patent No.: US 10,039,034 B1
(45) Date of Patent: Jul. 31, 2018

(54) CONTROLLING HANDOVER BASED ON CONFIDENCE IN RESPONSE TO LOAD-INFORMATION REQUEST

(71) Applicant: Sprint Spectrum L.P., Overland Park, KS (US)

(72) Inventors: Siddharth S. Oroskar, Overland Park, KS (US); Jasinder P. Singh, Olathe, KS (US); Clark D. Halferty, Lees Summit, MO (US)

(73) Assignee: Sprint Spectrum L.P., Overland Park, KS (US)

( * ) Notice: Subject to any disclaimer, the term of this patent is extended or adjusted under 35 U.S.C. 154(b) by 85 days.

(21) Appl. No.: 15/268,145

(22) Filed: Sep. 16, 2016

(51) Int. Cl.
*H04W 36/32* (2009.01)
*H04W 36/00* (2009.01)
*H04W 36/22* (2009.01)

(52) U.S. Cl.
CPC ....... *H04W 36/0055* (2013.01); *H04W 36/22* (2013.01)

(58) Field of Classification Search
CPC ............ H04W 36/0055; H04W 36/22; H04W 28/0289; H04W 72/0486; H04W 12/06; H04W 28/08; H04W 92/20; H04W 36/0066; H04W 36/0083; H04W 48/20; H04W 36/24; H04L 67/10
See application file for complete search history.

(56) References Cited

U.S. PATENT DOCUMENTS

| | | | |
|---|---|---|---|
| 9,072,026 B1 | 6/2015 | Singh et al. | |
| 2009/0028112 A1* | 1/2009 | Attar | H04W 36/245 370/332 |
| 2012/0082028 A1* | 4/2012 | Kojima | H04W 36/22 370/230 |
| 2012/0149378 A1* | 6/2012 | Li | H04W 36/0055 455/438 |
| 2013/0230014 A1* | 9/2013 | Kitaji | H04W 28/08 370/329 |
| 2014/0073322 A1* | 3/2014 | Henderson | H04W 16/24 455/435.1 |
| 2015/0038140 A1* | 2/2015 | Kilpatrick, II | H04W 64/00 455/436 |
| 2016/0183147 A1* | 6/2016 | Da Silva | H04W 36/0055 370/331 |

FOREIGN PATENT DOCUMENTS

EP    1 420 604    5/2004

* cited by examiner

*Primary Examiner* — Walli Butt

(57) ABSTRACT

A method and system to control WCD handover. A first base station will request load information from a second base station, and, based at least in part on a result of that request, the first base station will control handover of the WCD. The first base station may decline to hand over the WCD to the second base station in response to determining that the first base station did not responsively receive load information from the second base station. Further, the first base station may determine a level of confidence in load information of the second base station based on whether the first base station received load information of the second base station and based on whether the first and second base stations are provided by the same vendor, and the first base station may then use that level of confidence as a basis to control handover of the WCD.

20 Claims, 4 Drawing Sheets

CONTROLLING HANDOVER BASED ON CONFIDENCE IN RESPONSE TO LOAD-INFORMATION REQUEST

BACKGROUND

A typical wireless communication system includes a number of base stations each radiating to provide coverage in which to serve wireless communication devices (WCDs) such as cell phones, tablet computers, tracking devices, embedded wireless modules, and other wirelessly equipped devices, whether or not user operated. In turn, each base station may sit as a node on a core access network that includes entities such as a network controller, switches and/or gateways, and the core network may provide connectivity with one or more external transport networks such as the public switched telephone network (PSTN) and the Internet. With this arrangement, a WCD within coverage of the system may engage in air interface communication with a base station and may thereby communicate via the base station with various remote network entities or with other WCDs served by the base station.

Such a system may operate in accordance with a particular radio access protocol, examples of which include, without limitation, Long Term Evolution (LTE) (using orthogonal frequency division multiple access (OFDMA) and single-carrier frequency division multiple access (SC-FDMA)), Code Division Multiple Access (CDMA) (e.g., 1xRTT and 1xEV-DO), Global System for Mobile Communications (GSM), IEEE 802.11 (WIFI), and BLUETOOTH. Each protocol may define its own procedures for registration of WCDs, initiation of communications, handover between base station coverage areas, and other functions.

Further, each base station may provide wireless service to WCDs on one or more carrier frequencies, with the air interface defining various downlink and uplink channels. For instance, on the downlink, the air interface may define a reference channel for carrying a reference signal that WCDs can measure to evaluate base station coverage strength, the air interface may define various other downlink control channels for carrying control signaling to WCDs, and the air interface may define one or more downlink traffic channels for carrying bearer data and other information to WCDs. And on the uplink, the air interface may define an access channel for carrying WCD access requests to the base station, the air interface may define one or more other uplink control channels for carrying control signaling to the base station, and the air interface may define one or more uplink traffic channels for carrying bearer data and other information to the base station.

When a WCD initially enters into coverage of such a system, the WCD may scan for a strongest base station coverage area in which to operate, and the WCD may then engage in signaling with and via the base station, to register for service. The WCD may then be served by the base station in a connected state in which the WCD has an established radio-link-layer connection with the base station through which the WCD and base station may exchange bearer data (e.g., application-layer communications), facilitating communication by the WCD on the external transport network for instance.

When so served, the WCD may also regularly monitor coverage strength from its serving base station and from adjacent base stations, to help ensure that the WCD is served with sufficiently strong coverage and perhaps with the strongest available coverage. If the WCD's coverage from its serving base station becomes threshold weak and if another base station's coverage becomes threshold strong (e.g., threshold stronger than the serving base station's coverage or than a defined level), then the WCD may engage in signaling with its serving base station, and the serving base station may take action to coordinate handover of the WCD to the other base station.

OVERVIEW

When a base station is serving a WCD and is faced with the question of whether to coordinate handover of the WCD to a target base station, the serving base station may take into account load of the target base station as a basis to decide how to proceed. For example, the serving base station may condition handover of the WCD to the target base station on a determination that load of the target base station is threshold low (e.g., threshold lower than load of the serving base station or than a defined level). Measures of load for this purpose could take various forms, examples of which include measures of air interface utilization, quantity of served WCDs, backhaul utilization, and processor load, among others. Higher load of the target base station could mean that the base station is less available to serve the WCD at issue, and vice versa.

If the target base station is threshold highly loaded, then the serving base station may decline to invoke handover of the WCD to the target base station, notwithstanding the strong coverage that the WCD is receiving from the target base station. Whereas, if the target base station is not threshold highly loaded (e.g., is threshold lightly loaded), then the serving base station may decide to invoke handover of the WCD to the target base station, subject to possibly one or more other considerations as well.

In order to facilitate this or other evaluation of target base station load by the serving base station, the serving base station may engage in signaling with the target base station to request load information of the target base station, namely, one or more measures of load of the target base station. For instance, the serving base station may transmit to the target base station via an inter-base-station communication interface a load-information request message to which the target base station may then respond with a report of the target base station's load information. In practice, adjacent base stations may periodically engage in such load-information exchange signaling with each other so as to have relatively current measures of each other's load when it comes time to make handover decisions. Alternatively or additionally, a serving base station may request load information from a target base station at the time the serving base station is faced with the question of whether to hand over a WCD to the target base station.

Unfortunately, a problem that can arise in this process is that a serving base station and target base station may have inconsistent or incompatible signaling mechanisms and/or inconsistent or incompatible load calculation mechanisms. This could happen, for instance, if the two base stations are provided by different vendors (e.g., manufactured by different original equipment manufacturers (OEMs)) or in other situations.

By way of example, the base stations might use different signaling messages or signaling protocols for load-information exchange and might not speak each other's signaling language. In that situation, the serving base station may generate and send to the target base station a load-information request message, but the target base station may not understand that message and may therefore not respond with its load information. Or the target base station may generate and send its load information to the serving base station in response to a load-information request message, but the serving base station may not understand that response message and may therefore determine that it did not receive the target base station's load information in response to its load-information request message. Other reasons of incompatibility may similarly result in the serving base station determining that it did not receive the target base station's load information in response to a load-information request message.

Alternatively or additionally, the base stations may apply different calculations than each other for similar load metrics, in which case, even if the serving base station receives the target base station's load information, it may not be clear what that load information means, such as how it really compares with the serving base station's load information. For instance, one base station may calculate its air interface resource utilization based evaluation of certain types of air interface resources, whereas the other base station may calculate its air interface resource utilization based on evaluation of another type of air interface resources. Or one base station may deem its number of served WCDs to be a percentage, whereas the other base station may deem its number of served WCDs to be a count. Numerous other such inconsistencies in the ways the base stations compute and represent their load metrics are possible.

Disclosed herein is a method and system to help manage WCD handover based on consideration of such issues. In accordance with the disclosure, a first base station will request load information from a second base station, and, based at least in part on a result of that request, the first base station will decide whether to hand over a served WCD to the second base station. For instance, the first base station may decide whether it received load information of the second base station in response to the first base station's load-information request to the second base station and, if not, may responsively decline to hand over the WCD to the second base station.

Alternatively or additionally, the first base station may determine a level of confidence that the first base station has in the load information of the second base station, based on a result of the first base station's load-information request, and the first base station may then use that assigned level of confidence as a basis to decide whether to hand over the WCD to the second base station. The first base station may then control handover of the WCD in accordance with its decision.

Accordingly, in one respect, disclosed is a method for controlling handover in a wireless communication system, where the wireless communication system comprises a plurality of base stations each configured to wirelessly serve WCDs. As disclosed, the method includes a first base station requesting, from a second base station, load information of the second base station, and the first base station determining that the first base station did not receive the load information of the second base station in response to the requesting. Further, the method incudes the first base station receiving from a WCD served by the first base station a measurement report indicating that the WCD has detected coverage of the second base station, establishing the second base station as a candidate target for handover of the WCD from the first base station. And the method includes, responsive to the received report, the first base station making a decision of whether to hand over the WCD to the second base station, with the decision being based at least in part on the first base station having determined that the first base station did not receive the load information of the second base station in response to the requesting. The method then includes the first base station controlling handover of the WCD in accordance with the decision.

In another respect, disclosed is a method for controlling handover in a wireless communication system, where the wireless communication system comprises a plurality of base stations each configured to wirelessly serve WCDs, and where each base station is provided by a respective equipment vendor (e.g., OEM). As disclosed, the method includes a first base station receiving from a WCD served by the first base station a measurement report indicating that the WCD has detected coverage of a second base station Further, the method includes the first base station requesting from the second base station load information of the second base station, and the first base station making a determination of whether the first base station received the load information of the second base station in response to the request.

The method then further includes the first base station assigning a confidence level to the load information of the second base station. In particular, the first base station could assign a first confidence level to the load information of the second base station if the determination is that the first base station did not receive the load information of the second base station in response to the request. Whereas, the first base station could instead assign to the load information of the second base station a second confidence level higher than the first confidence level if the determination is that the first base station received load information of the second base station in response to the request and if the first and second base stations are provided by different vendors (e.g., different OEMs) than each other. And still further, the first base station could instead assign to the load information of the second base station a third confidence level higher than the second confidence level if the determination is that the first base station received load information of the second base station in response to the request and if the first and second base stations are provided by the same vendor (e.g., same OEM) as each other.

To facilitate this in practice, the first base station could be provisioned with data per neighboring base station (e.g., in a neighbor list) indicating for each neighboring base station a vendor (e.g., OEM) of the base station. Further, the serving base station could be provisioned with data indicating the vendor (e.g., OEM) of the serving base station. The serving base station could thus compare the vendor of the serving base station with the vendor of a given base station (e.g., before or after the given base station becomes a candidate target base station for the WCD) to determine whether the serving base station and the given base station are provided by the same vendor as each other or are provided by different vendors than each other.

The method then includes the first base station making a decision, based at least in part on the assigned confidence level, of whether to hand over the WCD to the second base station in response to the received measurement report. And the method includes the first base station controlling handover of the WCD in accordance with the decision.

In yet another respect, disclosed is a base station. As disclosed, the base station includes a wireless communication interface (including one or more antennas), configured to transmit and receive, where the base station is configured to serve one or more WCDs via the wireless communication interface. Further, the base station includes a network communication interface through which the base station is configured to engage in communication with other base stations. And the base station includes a controller, including one or more processing units, non-transitory data storage, and program instructions stored in the data storage and executable by the one or more processing units to carry out various base station operations as described herein.

By way of example, the base station operations could include identifying an adjacent base station as a candidate target for handover of a served WCD. Further, the base station operations could include requesting via the network communication interface, from the adjacent base station, load information of the adjacent base station, and detecting absence of a response to the requesting. Still further, the base station operations could include making a decision of whether to hand over the WCD to the adjacent base station, with the decision being based at least in part on the detected absence of response to the requesting for load information from the adjacent base station. And the base station operations could include controlling handover of the WCD in accordance with the decision.

These as well as other aspects, advantages, and alternatives will become apparent to those of ordinary skill in the art by reading the following detailed description, with reference where appropriate to the accompanying drawings. Further, it should be understood that the descriptions provided in this overview and below are intended to illustrate the invention by way of example only and not by way of limitation.

DETAILED DESCRIPTION

This description will discuss implementation by way of example in the context of an LTE network. It will be understood, however, that principles of the disclosure can extend to apply in other scenarios as well, such as with respect to other radio access protocols. Further, even within the context of LTE, variations from the details disclosed may be possible. For instance, elements, arrangements, and operations may be added, removed, combined, distributed, or otherwise modified. In addition, it will be understood that operations described as being performed by one or more entities may be implemented in various ways, such as by one or more processing units executing program instructions for instance.

Figure 1:
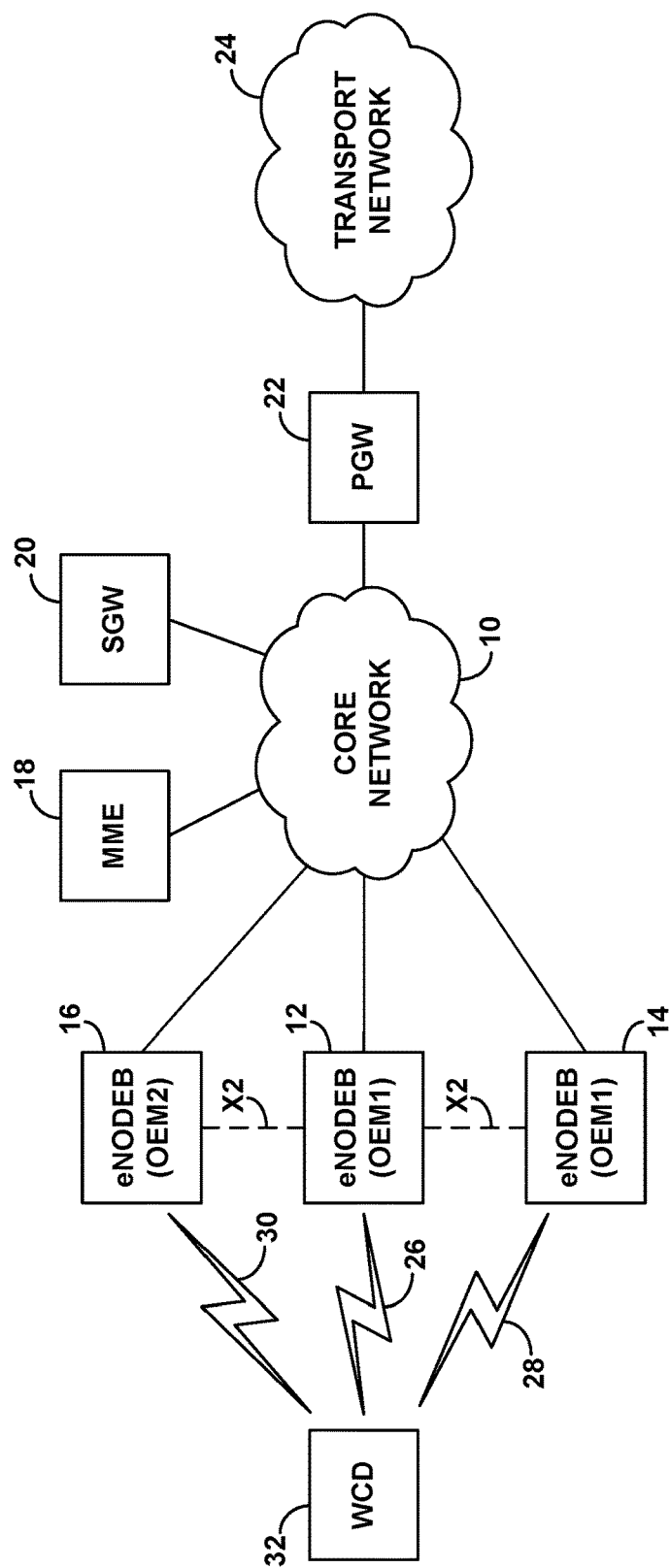
FIG. 1 is a simplified block diagram of an example wireless communication system in which features of the present disclosure can be implemented.

Referring to the drawings, as noted above, FIG. 1 is a simplified block diagram of a wireless communication system in which features of the present disclosure can be implemented. In particular, FIG. 1 depicts an example LTE network, which functions primarily to serve WCDs with wireless packet data communication service, including possibly voice-over-packet service, but may also provide other functions. The LTE network may be implemented by a wireless service provider. As shown, the LTE network includes a core network 10 (or "evolved packet core (EPC)") could be a packet-switched network, compliant with the industry standard system architecture evolution (SAE) for the LTE protocol, and thus the entities shown on the core network could each have an IP address and be configured to communicate with each other over packet-based tunnels or other communication interfaces, some of which could be dynamically configured as needed to serve individual WCDs for instance.

As shown, sitting on the core network 10 are by way of example several LTE base stations 12, 14 16 referred to as evolved-Node-B's (eNodeBs), as well as a mobility management entity (MME) 18, a serving gateway (SGW) 20, and a packet data network (PDN) gateway (PGW) 22, with the PGW then providing connectivity with a packet-switched transport network 24 such as the Internet.

Each of the eNodeBs 12, 14, 16 is configured to provide a respective coverage area 26, 28, 30, such as a respective cell or sector, in which the eNodeB can serve WCDs. As such, each eNodeB could take various forms. For instance, an eNodeB could be a macro eNodeB of the type typically including a tower-mounted antenna structure and providing a broad of coverage. Or an eNodeB could be a small-cell eNodeB or the like (e.g., a femtocell, relay, etc.) of the type typically having a smaller form factor and providing a narrower range of coverage.

Further, each eNodeB may be provided by a respective vendor, such as manufactured by a respective OEM. For instance, each eNodeB may include one or more units, such as baseband processing or control units, that operate to control various aspects of eNodeB service such load evaluation and handover processing, and at least those units may be provided by respective OEMs. Or the eNodeB as a whole may be provided by a respective OEM. In an example implementation, eNodeB OEMs may vary by region within the wireless service provider's network, but there may be borders between such regions, where eNodeBs of different OEMs provide overlapping coverage. In the arrangement of FIG. 1, for instance, we can assume that eNodeBs 12 and 14 are provided by the same OEM as each other, but eNodeB 16 is provided by a different OEM than eNodeB's 12 and 14.

In practice, each eNodeB could have communication interfaces with the MME 18 and the SGW 20 and could be configured to communicate with the MM and the SGW over those interfaces, and the SGW could have communication interfaces with the PGW and could be configured to communicate with the PGW over those interfaces. Further, as shown in the figure, the eNodeBs could have communication interfaces, such as X2 interfaces, with each other and could be configured to communicate with each other over those interfaces.

In addition, each eNodeB may broadcast in its coverage area a cell identifier to help distinguish its cell from nearby cells, and each eNodeB may further broadcast a reference signal that WCDs can detect as a basis to evaluate coverage of the base station. In LTE, for instance, an eNodeB may broadcast its cell identifier (physical cell identifier (PCI)) by transmitting coded synchronization signals, and the eNodeB may broadcast its reference signal on certain defined air interface resource elements. When a WCD is searching for coverage, the WCD may thus detect the eNodeB's reference signal and evaluate coverage strength (e.g., reference signal receive power (RSRP) and/or reference signal receive quality (RSRQ) such as signal-to-noise ratio or the like, and the WCD may determine the associated PCI of the detected cell.

FIG. 1 depicts a representative WCD 32 within coverage of all three eNodeBs. When WCD 32 first powers on or enters into coverage of the network, the WCD may search for the strongest coverage it can find and, as noted above, may engage in a signaling process to register for service by the associated eNodeB. By way of example, we can assume that the WCD detects a strongest reference signal from eNodeB 12 and thus engages in a process to register for service with eNodeB 12.

In a representative process, the WCD may first engage in random-access signaling and radio-resource-control (RRC) configuration signaling with eNodeB 12 to establish an RRC connection as a radio-link-layer connection between the WCD and the eNodeB 12. Further, the WCD may then engage in attach signaling via eNodeB 12 with MME 18, and the MME may facilitate authentication of the WCD and coordinate establishment of one or more bearers between the WCD and the PGW 22, to enable the WCD to engage in packet-data communication on transport network 24.

Once the WCD is thus served by eNodeB 12, the eNodeB 12 may then coordinate packet-data communication over the air to and from the WCD. For instance, when data arrives for the WCD from network 24, PGW 22 may pass the data to SGW 20, SGW 20 may pass the data to eNodeB 12, and eNodeB 12 may then schedule and provide downlink transmission of the data over the air to the WCD. And when the WCD has data to transmit on network 24, the WCD may transmit a scheduling request over the air to eNodeB 12, eNodeB 12 may schedule uplink transmission of the data, the WCD may transmit the data accordingly to eNodeB 12, and the data may pass to SGW 20 and to PGW 22, for transmission on network 24.

In addition, when the WCD is served by eNodeB 12, the WCD may receive from eNodeB 12, or otherwise be provisioned with, one or more measurement-events that define situations when the WCD should transmit measurement reports to eNodeB 12 to facilitate possible handover. LTE defines several such measurement events, including (i) Event A3, which is triggered when a neighboring cell becomes better than the serving cell by a defined threshold offset, (ii) Event A4, which is triggered when a neighboring cell becomes better than a defined threshold level, and (iii) Event A5, which is triggered when the serving cell becomes worse than a threshold and a neighboring cell becomes better than a threshold. The WCD may thus regularly evaluate coverage strength (e.g., RSRP and/or RSRQ) from serving eNodeB 12 as well as from other eNodeBs such as eNodeBs 14 and 16. And when the WCD detects that a measurement event occurs, the WCD may responsively transmit to serving eNodeB 12 a measurement report informing eNodeB 12 of the detected coverage strength(s) per detected PCI, to enable eNodeB 12 to process handover of the WCD if appropriate.

When eNodeB 12 receives from WCD such a measurement report that establishes sufficiently strong coverage of one or more other eNodeBs (e.g. compared with the serving eNodeB), eNodeB 12 may responsively invoke a process to hand over the WCD to the other eNodeB. Further, if the measurement specifies that the WCD detected threshold strong coverage from each of multiple other eNodeBs, eNodeB 12 may select the one reported eNodeBs that has the higher reported coverage strength and may responsively invoke a process to hand over the WCD to the selected eNodeB.

In a representative handover process, the serving eNodeB 12 may transmit to the identified target eNodeB a handover request message, the target eNodeB may reserve resources to facilitate serving the eNodeB, the eNodeBs and/or MME may transfer one or more bearers to the target eNodeB, and the eNodeB 12 may transmit to the WCD a directive for the WCD to transition from being served by eNodeB 12 to being served by the target eNodeB.

As noted above, another factor that a serving eNodeB can take into account when deciding whether to hand over a WCD to a target eNodeB is load of the target eNodeB, possibly by comparison with load of the serving eNodeB. Further, as noted above, to facilitate this, neighboring eNodeBs (eNodeBs that provide overlapping coverage) may exchange load information with each other, either regularly (e.g., periodically) or at the time handover between the eNodeBs becomes a possibility. In practice, for instance, a serving eNodeB 12 may regularly request and obtain load information from neighboring eNodeBs to facilitate a handover decision when necessary, or the serving eNodeB may request and obtain load information from a candidate target eNodeB when considering handover to that eNodeB.

This load information exchange process may involve an exchange of binary coded load-information signaling messages between the eNodeBs, optimally with the eNodeB properly interpreting the messages from the other eNodeB. For instance, a first eNodeB may transmit to a second, neighboring eNodeB a load-information request message as a binary coded signal that the second eNodeB would optimally interpret as a request for load information of the second eNodeB. The second eNodeB may then generate and transmit to the first eNodeB a load-information response message carrying the requested load information of the second eNodeB, as a binary coded signal that the first eNodeB would optimally interpret as a response providing load information of the second eNodeB. Further, the process may work in the other direction as well.

As noted above, however, problems can arise in this load information exchange process, particularly if the eNodeBs are provided by different vendors, as the eNodeBs may not be able to engage in compatible, understandable signaling with each other and/or may use different load calculations. By way of example, the eNodeBs may use different binary codewords or formats for their load-information messaging, and they might not understand the load-information messaging from each other. Thus, one eNodeB may request load information of the other eNodeB and may not receive a response or may effectively not receive a response, in either case amounting to a situation where the eNodeB determines that it does not receive load information of the other eNodeB in response to the load-information request. Further, even if an eNodeB receives load information upon request from a neighboring eNodeB, there is a chance that the load information metrics may have different meaning than what the requesting eNodeB would understand, and thus the load information may not be as meaningful as would be desired.

Per the present disclosure, as noted above, an eNodeB may further base a handover decision on the eNodeB's level of confidence in load information from a target eNodeB, with the level of confidence being based on the result of the eNodeB's request for load information from the target eNodeB. This level of confidence in the load information of the target base station could be determinative, with very low confidence leading to a decision to deny handover to the target eNodeB. Or the level of confidence in the load information could serve as a weighing or scaling factor in making a decision of whether to invoke handover to the target eNodeB, with high confidence in the load information weighing in favor of a decision to invoke handover, with low confidence weighting against a decision to invoke handover, and so forth.

In an example implementation, for instance, a first eNodeB may assign a lowest level of confidence to the load information of a second eNodeB (e.g., deem the first eNodeB to have a lowest level of confidence in the load information of the second eNodeB) if the first eNodeB determines that the first eNodeB does not receive the load information of the second eNodeB in response to the first eNodeB's request for the load information of the second eNodeB. In that situation, the first eNodeB may essentially have no confidence in the second eNodeB's load information, as the first eNodeB has no knowledge of the second eNodeB's load information. Such low confidence in the second eNodeB's load information may then be a basis for the first eNodeB to decline handover of a WCD to the second eNodeB, as the first eNodeB would not have a basis to know that the second eNodeB's load is light enough to sufficiently support service of the WCD.

On the other hand, the first eNodeB may assign a medium level of confidence to the load information of the second eNodeB if the first eNodeB determines that the first eNodeB receives the load information of the second eNodeB but if the first eNodeB determines that the first and second eNodeBs are provided by different vendors (e.g., different OEMs). In that situation, it may be the case that the first and second eNodeBs apply different load calculations than each other for comparable types of load, and so the first eNodeB's reference or perspective for understanding the second eNodeB's reported load information may be skewed or otherwise unreliable, raising some question of whether the second eNodeB's load is light enough to sufficiently support service of the WCD or is light enough compared with the first eNodeB's load.

And still further, the first eNodeB may assign a high level of confidence to the load information of the second eNodeB if the first eNodeB determines that the first eNodeB receives the load information of the second eNodeB and if the first eNodeB determines that the first and second eNodeBs are provided by the same vendor (e.g., the same OEM). In that situation, it is more likely that the first and second eNodeBs apply the same load calculations as each other, and so the first eNodeB's reference or perspective for understanding the second eNodeB's reported load information could reliably justify a decision that the second eNodeB's load is light enough to sufficiently support service of the WCD or is sufficiently light compared with the first eNodeB's load.

As further noted above, to facilitate consideration of vendors in this process, the first eNodeB could be provisioned with data (e.g., a neighbor list) that specifies, per neighboring eNodeB (e.g., per PCI) the OEM of the eNodeB, and the first eNodeB could be provisioned with data specifying its own OEM. Given the identity of a second eNodeB, the first eNodeB could thus determine from that data whether the first eNodeB and the second eNodeB are provided by the same OEM as each other or by different OEMs than each other.

In the context of FIG. 1, this process may play out with eNodeB 12 receiving from WCD 32 a measurement report indicating that the WCD detected coverage of both eNodeB's 14 and 16, specifying stronger detected coverage from eNodeB 16 than from eNodeB 14, but with the detected coverage of each eNodeB being sufficient (by itself or by comparison with the detected coverage of eNodeB 12) to justify handover. Further, eNodeB may have been requesting load information from each of eNodeBs 14 and 16 or may request load information from each such eNodeB in response to the WCD's measurement report.

As noted above, eNodeB 12 and eNodeB 16 in the example arrangement are provided by different OEMs than each other. As a result of this, or for one or more other reasons, eNodeB 12 may determine that eNodeB 12 does not receive load information of eNodeB 16 in response to one or more load-information request messages (e.g., attempts at requesting load information) that eNodeB 12 sends to eNodeB 16. In line with the discussion above, eNodeB 12 may therefore assign a very low confidence level in the load information of eNodeB 12. For this reason, or simply because eNodeB 12 determined that it did not receive load information of eNodeB 16 in response to its request, eNodeB 12 may responsively decline to hand over the WCD to eNodeB 16. Thus, even though the WCD reported stronger detected coverage of eNodeB 16 than of eNodeB 14, eNodeB 12 may hand over the WCD to eNodeB 14.

Alternatively, eNodeB 12 may determine that eNodeB 12 has received load information from both eNodeBs 14 and 16 in response to requests for load information that eNodeB 12 sent to eNodeBs 14 and 16. But eNodeB may determine based on OEM data like that described above and/or based on OEM indications provided in load-information response messages that eNodeB 14 is provided by the same OEM as eNodeB 12 and that eNodeB 16 is provided by a different OEM than eNodeB 12. Given this, eNodeB 12 may assign a medium confidence level to the load information received from eNodeB 16 and a high confidence level to the load information received from eNodeB 14. Using these confidence as weighting factors or the like, along with the WCD's reported coverage strengths, eNodeB may then decide to hand over the WCD to eNodeB 14 rather than to eNodeB 16, even though the WCD reported stronger detected coverage of eNodeB 16 than eNodeB 14. Of course, depending on the weights assigned in this process and depending on the actual reported coverage strengths, the handover decision by eNodeB 12 may vary.

Figure 2:
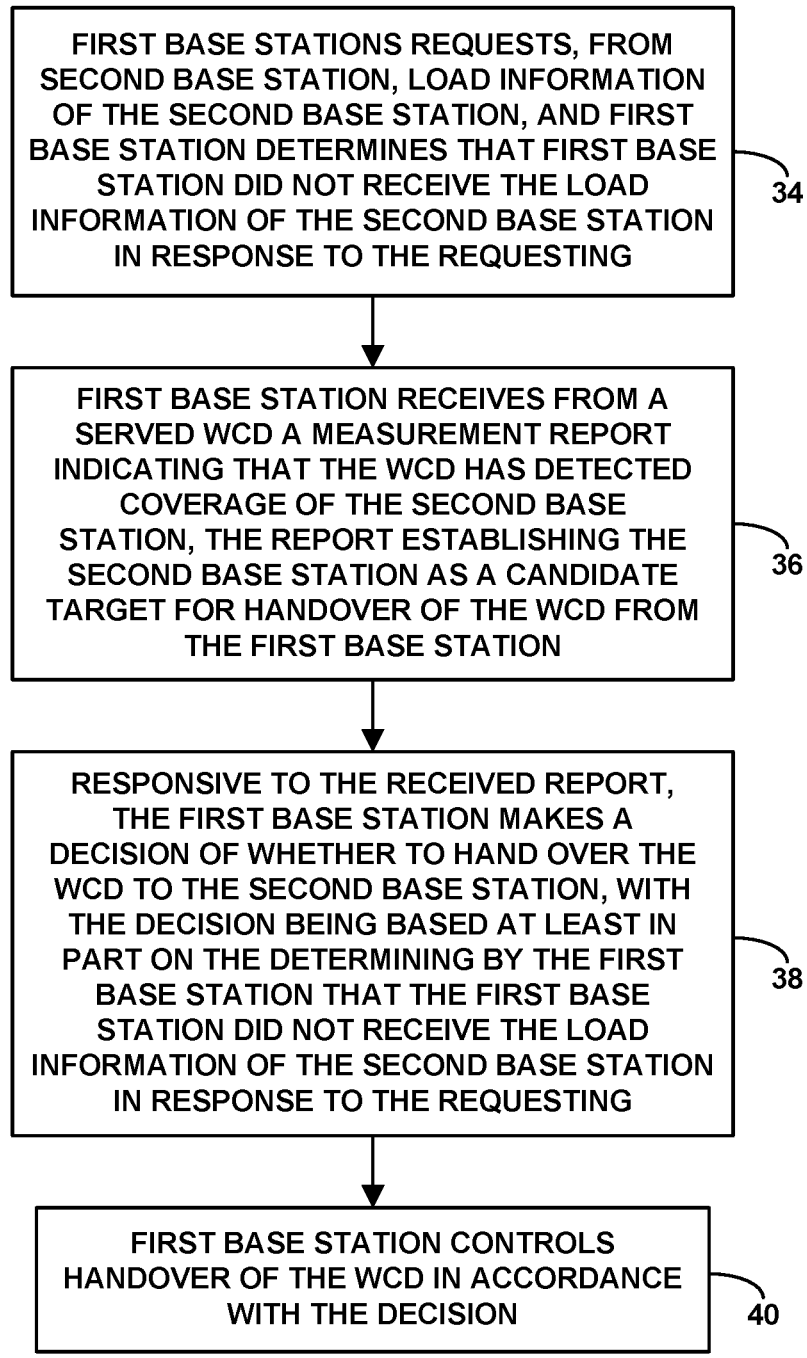
FIG. 2 is a flow chart depicting operations that can be carried out in accordance with the disclosure.

FIG. 2 is next a flow chart depicting operations that can be carried out by an eNodeB in accordance with the present disclosure, to control handover in a wireless communication system, where the wireless communication system includes a plurality of base stations each configured to wirelessly serve WCDs. As shown in FIG. 1, at block 34, the method includes a first of the base stations requesting, from a second of the base stations, load information of the second base station, and the first base station determining that the first base station did not receive the load information of the second base station in response to the requesting. At block 36, which may occur before or after block 34, the method includes the first base station receiving from a WCD served by the first base station a measurement report indicating that the WCD has detected coverage of the second base station, the report establishing the second base station as a candidate target for handover of the WCD from the first base station. At block 38, the method then includes, responsive to the received report, the first base station making a decision of whether to hand over the WCD to the second base station, with the decision being based at least in part on the determining by the first base station that the first base station did not receive the load information of the second base station in response to the requesting. And at block 40, the method includes the first base station controlling handover of the WCD in accordance with the decision.

As discussed above, the act of the first base station requesting the load information of the second base station could involve the first base station transmitting to the second base station multiple requests for the load information of the second base station (such as multiple attempts, multiple periodic requests, or the like), in which case the act of the first base station determining that the first base station did not receive the load information of the second base station in response to the requesting could involve the first base station detecting that the first base station did not receive the load information of the second base station in response to the multiple requests.

Further, the act of making the decision based at least in part on the determining by the first base station that the first base station did not receive the load information of the second base station in response to the requesting could involve the first base station deciding to not hand over the WCD to the second base station. More particularly, this act could (i) the first base station assigning a confidence level to the load information of the second base station, based on detecting by the first base station that the first base station did not receive the load information of the second base station in response to the requesting and (ii) deciding by the first base station, based at least in part on the assigned confidence level, to not hand over the WCD to the second base station.

Still further, as noted above, the measurement report could indicate that the WCD has detected threshold strong coverage of both the second base station and a third base station, in establishing both the second base station and the third base station as candidate targets for handover of the WCD from the first base station. And in that case, the act of making the decision based at least in part on the determining that the first base station did not receive the load information of the second base station in response to the requesting could involve deciding to hand over the WCD to the third base station instead of the second base station. And this could be the case even in a situation where the measurement report indicates stronger detected coverage of the second base station than the third base station.

Thus, the act of controlling handover in accordance with the decision could involve the first base station declining to hand over the WCD to the second base station, in which case the first base station may decline to hand over the WCD at all, or the first base station may hand over the WCD to a third base station rather than to the second base station.

Yet further, the load information at issue here could include a measurement such as air interface resource utilization, quantity of served WCDs, backhaul utilization, processor load, and/or one or more other load metrics now known or later developed.

Figure 3:
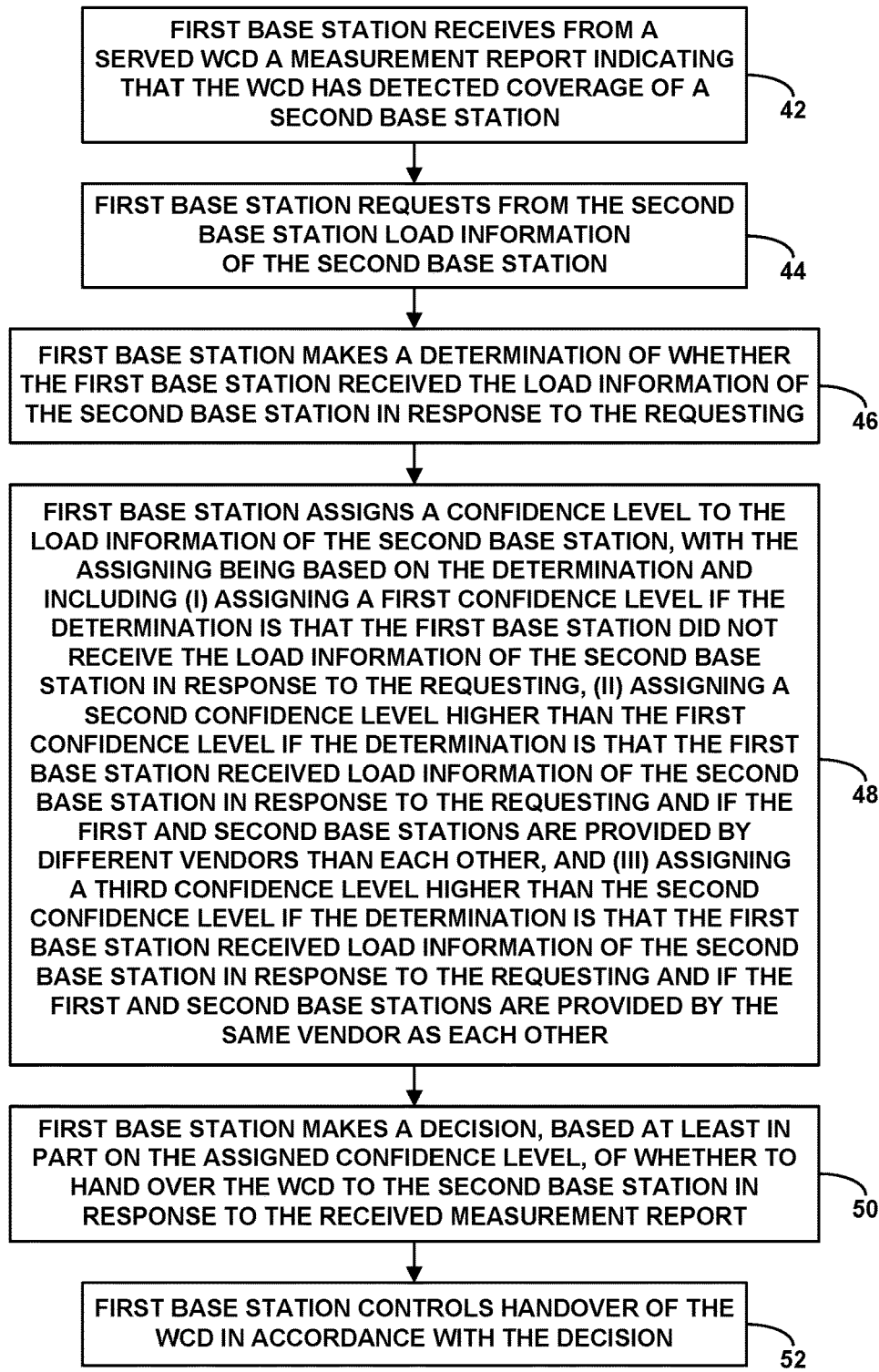
FIG. 3 is another flow chart depicting operations that can be carried out in accordance with the disclosure.

FIG. 3 is next another flow chart depicting operations that can be carried out by an eNodeB in accordance with the present disclosure, to control handover in a wireless communication system, where the wireless communication system includes a plurality of base stations each configured to wirelessly serve WCDs, and where each base station is provided by a respective equipment vendor.

As shown in FIG. 3, at block 42, the method includes a first base station receiving from a WCD served by the first base station a measurement report indicating that the WCD has detected coverage of a second base station. Further, at blocks 44 and 46, which could occur before or after block 42, the method includes the first base station requesting from the second base station load information of the second base station and the first base station making a determination of whether the first base station received the load information of the second base station in response to the requesting.

At block 48, which could also occur before or after block 42, the method then includes the first base station assigning a confidence level to the load information of the second base station, with the assigning being based on the determination and including (i) assigning a first confidence level if the determination is that the first base station did not receive the load information of the second base station in response to the requesting, (ii) assigning a second confidence level higher than the first confidence level if the determination is that the first base station received load information of the second base station in response to the requesting and if the first and second base stations are provided by different vendors than each other, and (iii) assigning a third confidence level higher than the second confidence level if the determination is that the first base station received load information of the second base station in response to the requesting and if the first and second base stations are provided by the same vendor as each other.

At block 50, the method then includes the first base station making a decision, based at least in part on the assigned confidence level, of whether to hand over the WCD to the second base station in response to the received measurement report. And at block 52, the method includes the first base station controlling handover of the WCD in accordance with the decision.

Note that numerous features described above can apply in the context of this method, and numerous aspects of this method context apply in the context of methods described above. By way of example, the act of the first base station requesting the load information of the second base station could involve the first base station transmitting to the second base station multiple requests for the load information of the second base station. As another example, the decision based at least in part on the assigned confidence level could be a decision to not hand over the WCD to the second base station. And where the WCD has reported detecting coverage of a third base station as well, the decision could be to hand over the WCD to the third base station instead of to the second base station, even if the WCD's measurement report indicates stronger detected coverage of the second base station than the third base station. Other examples are possible as well.

Figure 4:
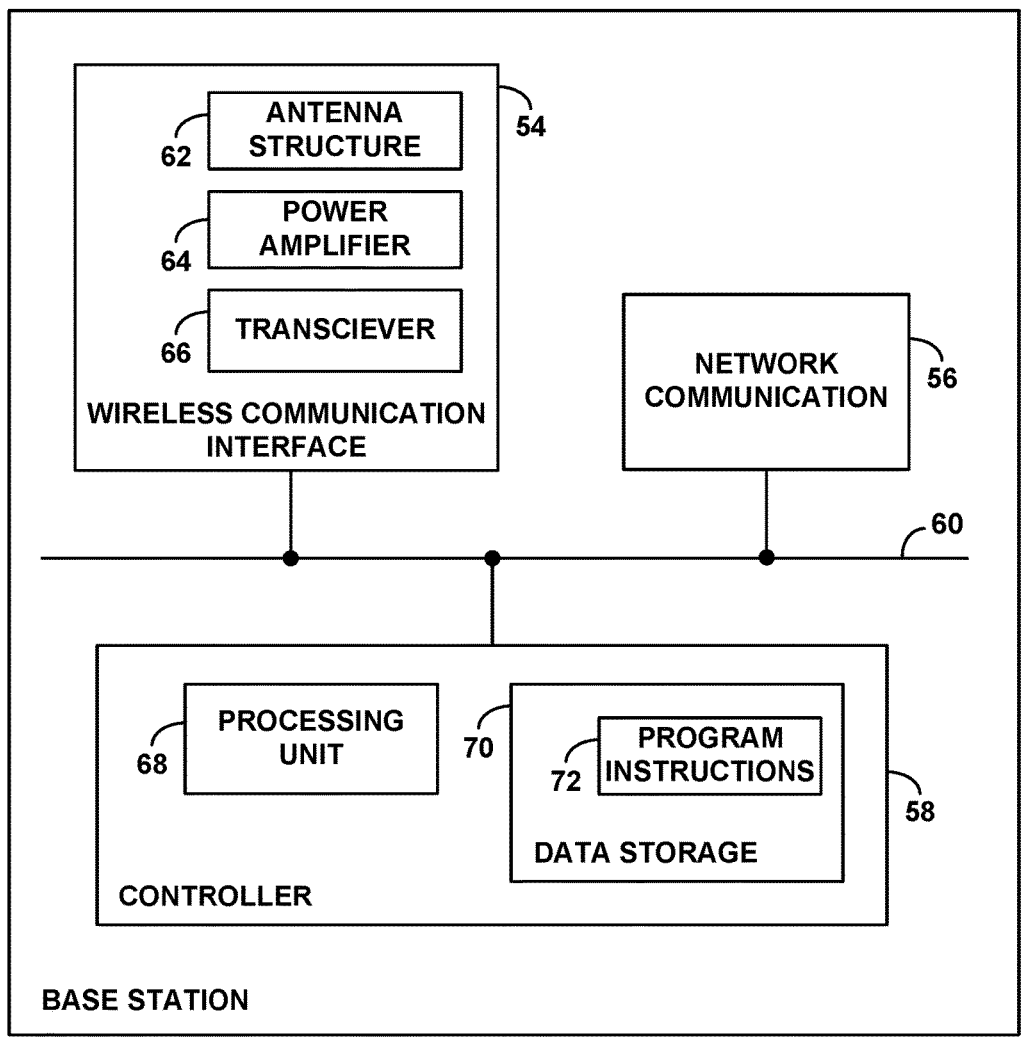
FIG. 4 is a simplified block diagram of a base station operable in the disclosed system.

Finally, FIG. 4 is a simplified block diagram of an example base station, showing some of the components that each of the base stations in FIG. 1 could include in an example implementation. As shown in FIG. 4, the base station includes a wireless communication interface 54, a network communication interface 56, and a controller 58. These components are shown communicatively linked together by a system bus or other communication link 60, but it will be understood that the components could alternatively be integrated together or distributed in various ways. For instance, aspects of the controller 58 could be provided in a chipset that implements functions of the wireless communication interface 54. Other examples are possible as well.

As shown, wireless communication interface 54 could include an antenna structure (e.g., one or more antennas) 62, which, together with a power amplifier 64 and a transceiver 66, facilitates air interface communication (transmitting and receiving), so that the base station can serve one or more WCDs via the wireless communication interface. Network communication interface 56 could then include a wired or wireless network interface, such as an Ethernet interface, through which the base station could communicate with other entities via a core network or the like.

And controller 58 could include a processing unit (one or more processors) 68, non-transitory data storage 70, and program instructions 72 stored in the non-transitory data storage and executable by the processing unit to carry out various operations described herein. For instance, the controller could be thus configured to cause the base station to carry out the operations of (i) identifying an adjacent base station as a candidate target for handover of a served WCD, (ii) requesting via the network communication interface, from the adjacent base station, load information of the adjacent base station, and detecting absence of a response to the requesting, (iii) making a decision of whether to hand over the WCD to the adjacent base station, with the decision being based at least in part on the detected absence of response to the requesting for load information from the adjacent base station, and (iv) controlling handover of the WCD in accordance with the decision. Further, other operations, factors, and features described above could be carried out in this context as well.

Exemplary embodiments have been described above. Those skilled in the art will understand, however, that changes and modifications may be made to these embodiments without departing from the true scope and spirit of the invention.

What is claimed is:

1. A method for controlling handover in a wireless communication system, wherein the wireless communication system comprises a plurality of base stations each configured to wirelessly serve wireless communication devices (WCDs), the method comprising:
    sending by a first base station, to a second base station, at least one request for load information of the second base station, and determining by the first base station that the first base station did not receive a response to the at least one request for the load information of the second base station;
    receiving by the first base station from a WCD served by the first base station a measurement report indicating that the WCD has detected coverage of the second base station, wherein the measurement report establishes the second base station as a candidate target for handover of the WCD from the first base station;
    responsive to the received measurement report, making a decision by the first base station of whether to hand over the WCD to the second base station, wherein the decision is based at least in part on the determining; and
    controlling by the first base station handover of the WCD in accordance with the decision.

2. The method of claim 1, wherein the sending by the first base station of the at least one request for the load information of the second base station occurs before the receiving by the first base station of the measurement report from the WCD.

3. The method of claim 1, wherein the sending by the first base station of the at least one request for the load information of the second base station occurs after the receiving by the first base station of the measurement report from the WCD.

4. The method of claim 1, wherein the sending by the first base station the at least one request for the load information of the second base station comprises transmitting by the first base station to the second base station multiple requests for the load information of the second base station, and wherein the determining comprises detecting that the first base station did not receive a response to the multiple requests for the load information of the second base station.

5. The method of claim 1, wherein making the decision based at least in part on the determining comprises deciding to not hand over the WCD to the second base station.

6. The method of claim 5, wherein making the decision based at least in part on the determining comprises (i) assigning by the first base station a confidence level to the load information of the second base station, based on the determining and (ii) deciding by the first base station, based at least in part on the assigned confidence level, to not hand over the WCD to the second base station.

7. The method of claim 1, wherein the measurement report indicates that the WCD has detected threshold strong coverage of both the second base station and a third base station, wherein the measurement report establishes both the second base station and the third base station as candidate targets for handover of the WCD from the first base station, and wherein making the decision based at least in part on the determining comprises deciding to hand over the WCD to the third base station instead of to the second base station.

8. The method of claim 7, wherein the measurement report indicates stronger detected coverage of the second base station than the third base station.

9. The method of claim 1, wherein controlling handover in accordance with the decision comprises at least one operation selected from the group consisting of (i) declining to hand over the WCD to the second base station and (ii) handing over the WCD to a third base station rather than to the second base station.

10. The method of claim 1, wherein the load information comprises a measurement selected from the group consisting of air interface resource utilization, quantity of served WCDs, backhaul utilization, and processor load.

11. A method for controlling handover in a wireless communication system, wherein the wireless communication system comprises a plurality of base stations each configured to wirelessly serve wireless communication devices (WCDs), wherein each base station is provided by a respective equipment vendor, the method comprising:
    receiving by a first base station from a WCD served by the first base station a measurement report indicating that the WCD has detected coverage of a second base station;
    sending by the first base station, to the second base station, at least one request for load information of the second base station;
    making a determination by the first base station of whether the first base station received a response to the at least one request for the load information of the second base station;
    assigning by the first base station a confidence level to the load information of the second base station, wherein the assigning is based on the determination and comprises (i) assigning a first confidence level if the determination is negative, (ii) assigning a second confidence level higher than the first confidence level if the determination is affirmative and if the first and second base stations are provided by different vendors than each other, and (iii) assigning a third confidence level higher than the second confidence level if the determination is affirmative and if the first and second base stations are provided by the same vendor as each other;
    making a decision by the first base station, based at least in part on the assigned confidence level, of whether to hand over the WCD to the second base station in response to the received measurement report; and
    controlling by the first base station handover of the WCD in accordance with the decision.

12. The method of claim 11, wherein the sending by the first base station of the at least one request for the load information of the second base station occurs before the receiving by the first base station of the measurement report from the WCD.

13. The method of claim 11, wherein the sending by the first base station of the at least one request for the load information of the second base station comprises transmitting by the first base station to the second base station multiple requests for the load information of the second base station.

14. The method of claim 11, wherein making the decision based at least in part on the assigned confidence level comprises deciding, based at least in part on the assigned confidence level, to not hand over the WCD to the second base station.

15. The method of claim 11, wherein the measurement report indicates that the WCD has detected threshold strong coverage of both the second base station and a third base station, wherein the measurement report establishes both the second base station and the third base station as candidate targets for handover of the WCD from the first base station, and wherein making the decision based at least in part on the assigned confidence level comprises deciding, based at least in part on the assigned confidence level, to hand over the WCD to the third base station instead of to the second base station.

16. The method of claim 15, wherein the measurement report indicates stronger detected coverage of the second base station than the third base station.

17. The method of claim 11, wherein controlling handover in accordance with the decision comprises at least one operation selected from the group consisting of (i) declining to hand over the WCD to the second base station and (ii) handing over the WCD to a third base station rather than to the second base station.

18. The method of claim 11, wherein the load information comprises a measurement selected from the group consisting of air interface resource utilization, quantity of served WCDs, backhaul utilization, and processor load.

19. A base station configured to control handover, the base station comprising:

a wireless communication interface including one or more antennas, configured to transmit and receive, wherein the base station is configured to serve one or more wireless communication devices (WCDs) via the wireless communication interface;

a network communication interface through which the base station is configured to engage in communication with other base stations; and a controller including one or more processing units, non-transitory data storage, and program instructions stored in the data storage and executable by the one or more processing units to carry out operations including:

identifying an adjacent base station as a candidate target for handover of a served WCD, sending via the network communication interface, to the adjacent base station, a request for load information of the adjacent base station, and detecting absence of a response to the request, making a decision of whether to hand over the WCD to the adjacent base station, wherein the decision is based at least in part on the detected absence of response to the request for load information from the adjacent base station, and controlling handover of the WCD in accordance with the decision.

20. The base station of claim 19, wherein controlling the handover of the WCD in accordance with the decision comprises an operation selected from the group consisting of (i) declining to hand over the WCD to the second base station and (ii) handing over the WCD to a third base station rather than to the second base station.

\* \* \* \* \*